United States Defensive Publication [19] (H) [11] T104,502

Liu [43] Aug. 7, 1984

[54] PROCESS FOR MAKING METAL/PROPYLENE POLYMER LAMINATES

[76] Inventor: Chia-Seng Liu, 9 White Clay Crescent, Meeting House Hill, Newark, Del. 19711

[21] Appl. No.: 569,552

[22] Filed: Jan. 9, 1984

Related U.S. Application Data

[63] Continuation of Ser. No. 394,050, Jun. 30, 1982, abandoned, which is a continuation of Ser. No. 249,786, Apr. 1, 1981, abandoned, which is a continuation of Ser. No. 122,898, Feb. 20, 1980, abandoned, which is a continuation-in-part of Ser. No. 46,526, Jun. 7, 1979, abandoned.

[51] Int. Cl.[3] ..... B29D 7/02

[52] U.S. Cl. ..... 156/244.11; 156/244.24; 156/244.27

[57] ABSTRACT

Disclosed is a process for the lamination of metal and propylene polymer layers, comprising extrusion coating the polymer onto the metal, cooling the polymer until it solidifies, postheating the laminate at a temperature above the melting point of the polymer, and quenching the laminate.

6 Claims, 1 Sheet Drawing,

15 Pages Specification

The file of this unexamined application may be inspected and copies thereof may be purchased (849 O.G. 1221, Apr. 9, 1968).

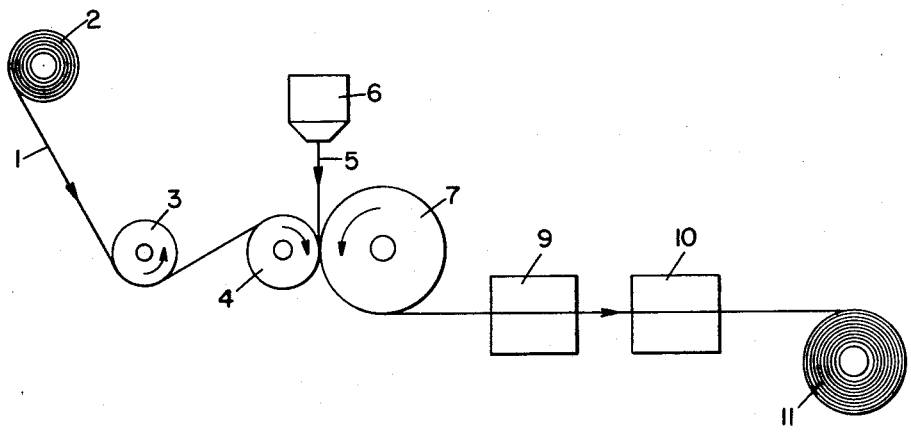

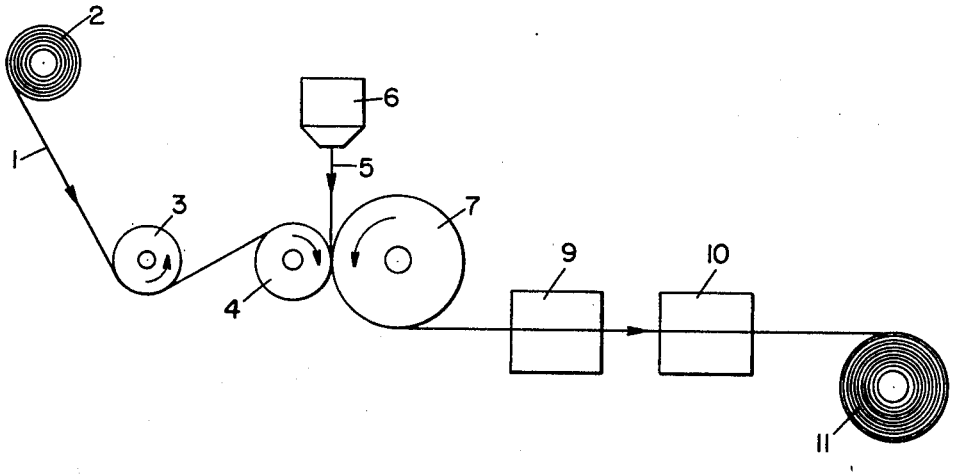
2
6
1
5
3
7
9
10
4
11